April 7, 1964   A. ROSENFELD ETAL   3,128,423
TRANSISTORIZED POWER SUPPLY
Filed Aug. 1, 1958
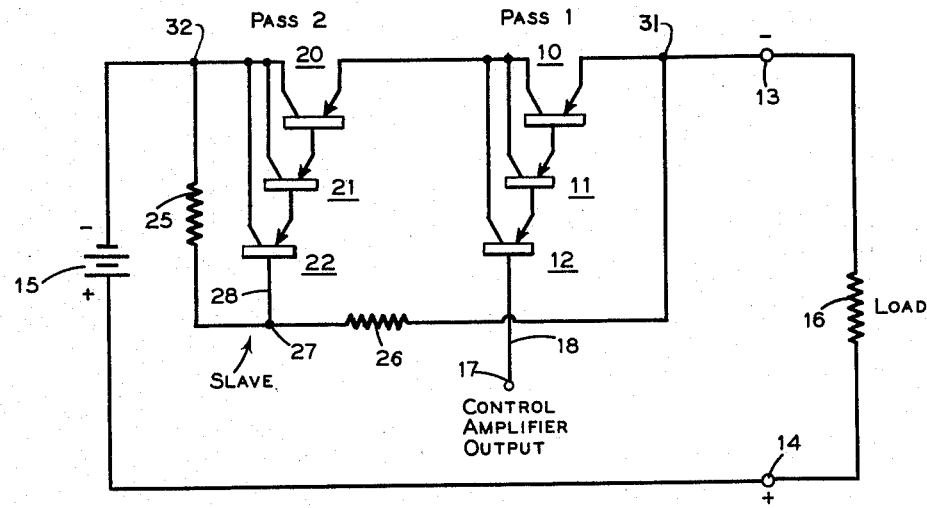
INVENTORS
Aaron Rosenfeld
BY  Kenneth Kupferberg
ATTORNEY Patent text …

United States Patent Office

3,128,423
Patented Apr. 7, 1964

3,128,423
TRANSISTORIZED POWER SUPPLY
Aaron Rosenfeld, Jackson Heights, and Kenneth Kupferberg, Flushing, N.Y., assignors to Forbro Design Inc., New York, N.Y., a corporation of New York
Filed Aug. 1, 1958, Ser. No. 752,485
1 Claim. (Cl. 323—22)

This invention relates to transistorized power supplies and, more particularly, to novel circuitry providing for power supply output voltages which are a multiple of the voltage ratings of the transistors.

At the present time, the voltage ratings of economically available transistors are of the order of 20 to 40 volts, and even specially available transistors have a voltage rating not in excess of 100 volts. In many instances, it is desirable for an electronic power supply having an output voltage of several hundred volts. If it is attempted to transistorize such a power supply, the transistors will fail due to their relatively low voltage ratings. While many attempts have been made to overcome this problem, it does not appear that a successful solution has yet been found.

In accordance with the present invention, the problem of providing high output voltages in transistorized power supplies is solved by providing a pass transistor arrangement comprising two or more transistors connected in series and means for dividing the pass voltage substantially equally between the several transistors. One of these transistors, which may be termed the "master" or "control" pass transistor, has a control signal applied thereto for regulating the output voltage. This master transistor, by varying the voltage drop thereacross, controls the overall voltage drop and, by virtue of the voltage divider network, the overall voltage drop, which is divided between the several series connected pass transistors, is distributed equally across the several series pass transistors including any incremental change in the overall voltage drop due to the control signal applied to the master pass transistor. The transistors, other than the master transistor, may be designated "slave" transistors.

For an understanding of the invention principles, reference is made to the following description of a typical embodiment thereof as illustrated in the accompanying drawing. In the drawing, the single figure is a schematic wiring diagram of a transistorized power supply embodying the invention.

Referring to the drawing, the power supply is illustrated as comprising pass or power transistors 10 and 20 each having driving transistors 11, 12 and 21, 22 associated therewith. While only two transistors 10 and 20 have been illustrated, it should be understood that this is exemplary only and any number of transistors arranged in series relation may be used within the scope of the invention. Transistors 10 and 20 are connected in series between the negative output terminal 13 and the negative terminal of input power or potential source 15, shown by way of example as a battery. The positive terminal of source 15 is connected to positive output terminal 14, and a load 16 is shown as connected between terminals 13 and 14.

Master transistor 10 and its associated driving transistors 11, 12 are the control elements, and transistor 20 and its associated driving transistors 21, 22 are slave connections. The control or output voltage determining signal is derived from the usual amplifier (not shown) controlled by a reference voltage source (not shown). Any difference between the output and reference voltage causes a transistor controlling change in a control signal applied to terminal 17 connected by conductor 18 to the base of the first driving transistor 12 for transistor 10. The emitter of transistor 12 is connected to the base of second driving transistor 11, and the emitter of transistor 11 is connected to the base of power transistor 10. The collectors of transistors 11 and 12 are connected to the collector of transistor 10 and to the emitter of transistor 20. The emitter of transistor 10 is connected to output terminal 13, and the collector of transistor 20 is connected to the negative terminal of source 15.

The connections of transistors 20, 21, 22 are the same as those of transistors 10, 11, 12. The transistors are thus connected as emitter followers, with the signal input at terminal 17 determining the output voltage at output terminals 13, 14.

If we assume that a load current of 10 amperes flows in the collector circuits of pass transistors 10 and 20, and if these power transistors have a current gain factor of 100, then the base current of power transistors 10, 20 will be 100 milliamperes or 0.1 ampere. This, in turn, is the emitter current of driving transistors 11 and 21, and if the current gain factor of these driving transistors is also 100, the bases thereof will require a driving current of 1 milliampere. Correspondingly, this is the emitter current of second driving transistors 12 and 22. Hence, if these latter driving transistors also have a current gain ratio of 100, the required base currents thereof under the given load condition of 10 amperes, are only 10 microamperes.

In accordance with the invention, a voltage divider is connected across the entire pass unit which is shown solely by way of example, as comprising only two pass assemblies although more may be used. This voltage divider comprises equal resistors 25, 26 connected together at terminal 27 which is connected by conductor 28 to the base of second driving transistor 22. The voltage at terminal 27 is therefore one-half the voltage across the pass assembly. As the transistors are connected as emitter followers, the voltage at the emitters of transistors 20, 21, and 22 is also the midpoint in voltage between the two transistors. If more than two transistors were used, the base of the lower stage of each of the additional transistors would be connected to the junction of a pair of series connected equal resistances such as 20 and 25, the number of resistances being equal to the number of transistors in series.

If resistors 25, 26 are so selected that a small current of the order of a few milliamperes flows therethrough, the current of 10 microamperes required to drive the base of the lowest level transistor 22 will not disturb the voltage setting at terminal 27 so that the voltage remains equally divided between the control and slave transistor assemblies.

The voltage drop between the junction points 31 and 32 represents the total voltage drop across the pass transistors 10 and 20, and by virtue of the connection of the first stage 22 of pass transistor assembly 20 to the junction 27, this voltage drop is divided equally between the two transistor assemblies. Thus, assuming that there is a 50 volt drop between points 31 and 32, there will be a 25 volt drop across each of the pass transistors 10 and 20. If the load voltage increases to, for example, 60 volts, the drop between points 31 and 32 will be 60 volts and there will be a 30 volt drop across each of the pass transistors 10 and 20. Upon such an increase, a control signal will be applied through terminal 17 and conductor 18 to the base of transistor 12, and thus to transistor 10, in such a manner as to reduce the total voltage drop to 50 volts. This, in the particular example selected for illustration, would amount to a 10 volt change in the voltage drop between points 31 and 32 and, as the transistor 10 has only one-half the total voltage applied thereacross, the change in the voltage drop across this transistor will be only five volts. With the reduction of five volts in the voltage drop across resistance 26, there will be a corresponding reduction of 5 volts across resistor 25 and thus a corresponding reduction in 5 volts of the voltage across the transistor 20. Thus, by the voltage divider network comprising equal value series connected resistances, the overall voltage drop is divided equally between the several pass transistors. Furthermore, changes in the voltage drop across the series connected transistors are divided equally between the several transistors. Thus, and solely by operation of the pass transistor 10, which is the master transistor, and in response to control signals applied to terminal 17, the slave transistors, such as transistor 20, follow the action of the master transistor 10 in correctively re-adjusting the voltage drop across each slave transistor.

The same voltage dividing principle involving equal resistors and emitter follower connected transistors may be used with any number of slave transistor assemblies in series with a control transistor assembly.

While a specific embodiment of the invention has been shown and described in detail to illustrate the application of the invention principles, it will be understood that the invention may be embodied otherwise without departing from such principles.

What is claimed is:

An electronic power supply comprising, in combination, a source of input potential; a pair of output terminals; a control power transistor; at least one slave follower transistor connected in series with said control power transistor and said source and said output terminals; driving transistors associated with said power transistors, the current gain of said transistors being such that, for a relatively heavy current flow through said power transistors, only a minute driving current is required for the lowest level driving transistors; a connection for applying a control signal to the driving electrode of the lowest level driving transistor for said control power transistor; a passive voltage divider connected in parallel with said power transistors between said source and an output terminal; and means connecting points on said voltage divider to the driving electrodes of the lowest level driving transistor for each slave power transistor, such points being so selected that there is an equal division of the voltage drop of said divider across each power transistor; the voltage divider being designed for a relatively small current flow therethrough, and the minute driving current for each lowest level driving transistor having substantially no effect on the voltage at said points.

References Cited in the file of this patent

UNITED STATES PATENTS

| | | |
|---|---|---|
| 2,445,171 | Graff-Baker | July 13, 1948 |
| 2,698,416 | Sherr | Dec. 28, 1954 |
| 2,915,693 | Harrison | Dec. 1, 1959 |
| 2,922,945 | Norris | Jan. 26, 1960 |

FOREIGN PATENTS

| | | |
|---|---|---|
| 451,993 | Italy | Oct. 4, 1949 |
| 954,956 | France | June 20, 1949 |

OTHER REFERENCES

Electronic Design, Design Considerations for Semiconductor Regulated Power Supplies, Sherr and Levy, July 15, 1956.